US006976226B1

(12) United States Patent
Strong et al.

(10) Patent No.: US 6,976,226 B1
(45) Date of Patent: Dec. 13, 2005

(54) TRANSLATING TABULAR DATA FORMATTED FOR ONE DISPLAY DEVICE TO A FORMAT FOR DISPLAY ON OTHER DISPLAY DEVICES

(75) Inventors: Jack B. Strong, Mountain View, CA (US); Jonathan J. Kleid, Mountain View, CA (US); Vivek Patel, Palo Alto, CA (US); David Champlin, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 365 days.

(21) Appl. No.: 09/900,484

(22) Filed: Jul. 6, 2001

(51) Int. Cl.[7] .............................................. G06F 3/14
(52) U.S. Cl. ....................... 715/788; 715/792; 715/864
(58) Field of Search ........................ 345/674; 715/792, 715/788, 864, 798, 744

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,916,441 A | 4/1990 | Gombrich | |
| 4,972,457 A | 11/1990 | O'Sullivan | 379/59 |
| 5,067,164 A | 11/1991 | Denker et al. | |
| 5,101,439 A | 3/1992 | Kiang | |
| RE34,034 E | 8/1992 | O'Sullivan | 379/59 |
| 5,189,632 A | 2/1993 | Paajanen | 364/705.05 |
| 5,227,614 A | 7/1993 | Danielson et al. | |
| 5,305,195 A | 4/1994 | Murphy | 364/401 |
| 5,334,824 A | 8/1994 | Martinez | |
| 5,335,276 A | 8/1994 | Thompson | 380/21 |
| 5,379,057 A | 1/1995 | Clough et al. | |
| 5,392,447 A | 2/1995 | Schlack et al. | |
| 5,398,021 A | 3/1995 | Moore | 340/825.27 |
| 5,436,960 A | 7/1995 | Campana | 379/58 |
| 5,465,401 A | 11/1995 | Thompson | |
| 5,513,254 A | 4/1996 | Markowitz | 379/100 |
| 5,572,643 A | 11/1996 | Judson | 395/793 |
| 5,673,322 A | 9/1997 | Pepe et al. | 380/49 |
| 5,704,029 A | 12/1997 | Wright, Jr. | 395/149 |
| 5,708,478 A | 1/1998 | Tognazzini | 348/552 |
| 5,732,074 A | 3/1998 | Spaur et al. | 370/313 |
| 5,781,894 A | 7/1998 | Petrecca et al. | 705/14 |
| 5,809,317 A | 9/1998 | Kogan et al. | 715/501.1 |
| 5,812,131 A * | 9/1998 | Bertram | 345/798 |

(Continued)

FOREIGN PATENT DOCUMENTS

EP          0149762 A1       7/1986

(Continued)

OTHER PUBLICATIONS

BlackBerry Handheld Users Guide, Sep. 7, 1999.

(Continued)

Primary Examiner—Raymond J. Bayerl
Assistant Examiner—Dennis G. Bonshock
(74) Attorney, Agent, or Firm—Fenwick & West LLP

(57) ABSTRACT

A method and system are provided that translates tabular data prepared for a first display format into a second display format. Tabular data prepared for display on a conventional desktop display device may be adjusted for display on a portable computing device having a different display device. Tabular formatting may be removed for single row and single column tables. The method and system may also remove tabular formatting for tables having horizontal dimensions exceeding a specified amount. Tabular data may be removed from tables having more than one column that exceeds a specified maximum column size. The method and system may also identify nested tables and eliminate tabular formatting for all but the innermost tables.

20 Claims, 13 Drawing Sheets

U.S. PATENT DOCUMENTS

| | | | |
|---|---|---|---|
| 5,818,446 A | 10/1998 | Bertram et al. | 345/334 |
| 5,835,861 A | 11/1998 | Whiteside | 455/466 |
| 5,838,314 A | 11/1998 | Neel et al. | 345/327 |
| 5,848,397 A | 12/1998 | Marsh et al. | 705/14 |
| 5,850,433 A | 12/1998 | Rondeau | 379/201 |
| 5,852,775 A | 12/1998 | Hidary | 455/404 |
| 5,854,624 A | 12/1998 | Grant | 345/169 |
| 5,854,897 A | 12/1998 | Radziewcz et al. | 395/200.54 |
| 5,870,683 A | 2/1999 | Wells et al. | 455/556 |
| 5,877,757 A | 3/1999 | Baldwin et al. | 345/336 |
| 5,889,852 A | 3/1999 | Rosecrans et al. | 379/355 |
| 5,913,040 A | 6/1999 | Rakavy et al. | 395/200.62 |
| 5,918,236 A | 6/1999 | Wical | 707/500 |
| 5,923,736 A | 7/1999 | Shachar | 379/93.17 |
| 5,948,061 A | 9/1999 | Merriman et al. | 709/219 |
| 5,960,074 A | 9/1999 | Clark | 379/310 |
| 5,977,972 A | 11/1999 | Bates et al. | 345/341 |
| 6,058,304 A | 5/2000 | Callaghan | 455/422 |
| 6,067,451 A | 5/2000 | Campana | 455/412 |
| 6,188,789 B1 | 2/2001 | Marianetti | 382/179 |
| RE37,141 E | 4/2001 | O'Sullivan | 455/557 |
| 6,219,694 B1 | 4/2001 | Lazaridis | 709/206 |
| 6,272,190 B1 | 8/2001 | Campana | 375/347 |
| 6,295,372 B1 | 9/2001 | Hawkins et al. | |
| 6,593,944 B1 * | 7/2003 | Nicolas et al. | 345/744 |
| 6,611,358 B1 * | 8/2003 | Narayanaswamy | 358/442 |

FOREIGN PATENT DOCUMENTS

| | | |
|---|---|---|
| EP | 0797368 A2 | 3/1997 |
| JP | 03204259 | 5/1991 |
| WO | WO 97/26729 | 7/1997 |
| WO | WO 98/47090 | 10/1998 |

OTHER PUBLICATIONS

BlackBerry Developer's Guide SDK User's Guide Version 2.0 (Data TAC), Jun. 12, 2000.

BlackBerry Enterprise Server Software Installation and Getting Started Guide, Sep. 29, 1999.

Choi, H., *First Look: Samsung I300 Cellphone/PDA*, retrieved from internet www.techtv.com, Mar. 28, 2001.

Handspring Product Information: *VisorPhone The Springboard Module that Transforms your Visor into an Extraordinary Phone*, (2000).

Handspring, *Sprint and Airprime Delivery First Wireless CDMA Phone and Data Module for the Handspring Visor*, retrieved from internet www.handspring/pr59.jhtml Aug. 2, 2001.

IBM Technical Disclosure Bulletin: *SimpleUser Interface to a Cellular Telephone*, retrieved from internet, Oct. 2001.

Kyocera's Smartphone Series, retrieved from internet www.kyocera-wireless.com, Apr. 2001.

Tam, P., "Palm, Motorola to Make PDA Cell Phones", retrieved from internet http://www.zdnet.com/zdnn/stories/news/0,4586,2631800,00.html, Sep. 25, 2000.

Kamada, T., Compact HTML for Small Information Appliances, W3 Consortium Note Feb. 9, 1998, pp. 1-12, USA.

UP SDKDocumentation: HDML 2.0 Language Reference Version 2.0, Unwired Planet, Jul. 1997, pp. 1-56, Redwood Shores, CA.

Hara, Y., W3C Putting Compact HTML, HDML to Test for Net Access—Mobile Markup Languages Face Off, Electronic Engineering Times, No. 1001, Apr. 6, 1998, pp. 1-2, Tokyo, Japan.

Hyland, T., Handheld Device Markup Language FAQ, Unwired Planet, W3 Consortium Note, Apr. 1, 1997, pp. 1-3, Redwood Shores, CA.

Intelligent User Interface Prompt Level, IBM Technical Disclosure Bulleting, vol. 35, No. 1A, Jun. 1, 1992, pp. 25-26, Armonk, New York.

Stajano, F., et al.; The Thinnest of Clients: Controlling It All Via Cellphone, Mobile Computing and Communications Review, vol. 2, No. 4, pp. 1-8 (Oct. 1998).

*American Programmer*, N.Y., American Programmer, Inc. (Dec. 1991), pp. 4-33.

*At Last, Technology Hamesse [sic] One of the Most Powerf [sic] Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.

Carr, R.M., *The Point of the Pen, Byte* (Feb. 1991, Reprinted), 10 pages.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*Go Corporation Information Statement*, (Nov. 8, 1993), 114 pages.

*IBM Selects Racotek Data/Voice Communications Services to Interface With Touchmobile Product*, PR Newswire (Jan. 25, 1993), 2 pages.

*IBM TouchMobile Information and Planning Guide*, International Business Machines Incorporated (Mar. 1993), 20 pages.

*IBM TouchMobile Solution for Data Capture and Communication, Keeping Your Business Moving in the 90s*, International Business Machines Incorporated (Jan. 1993), 13 pages.

*IBM'S Touchmobile Helps Field Workers Collect Data at the Touch of a Finger*, PR Newswire (Jan. 26, 1993), 2 pages.

MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.

MacNeill, D., *Wireless Newton Technology Goes to Work*, On The Go Magazine [online]. (Sep. 8, 1993), Retrieved from the Internet.

Maki, K., *The AT&T EO Travel Guide*, N.Y., John Wiley & Sons, Inc., 1993, pp. iii-555.

Schlender, B. R., *Hot New PCs That Read Your Writing*, Fortune (Feb. 11, 1991, Reprinted), 6 pages.

Stock, R., *The World of Messaging An Introduction to Personal Communications*, Mountain View, EO, Inc., 1992, 1993, pp. ii-69.

"IBM WebSphere Transcoding Publisher, Version 4.0 for Multiplatform" [online], 2001, IBM Corporation [retrieved Aug. 12, 2003]. Retrieved from the Internet.

* cited by examiner

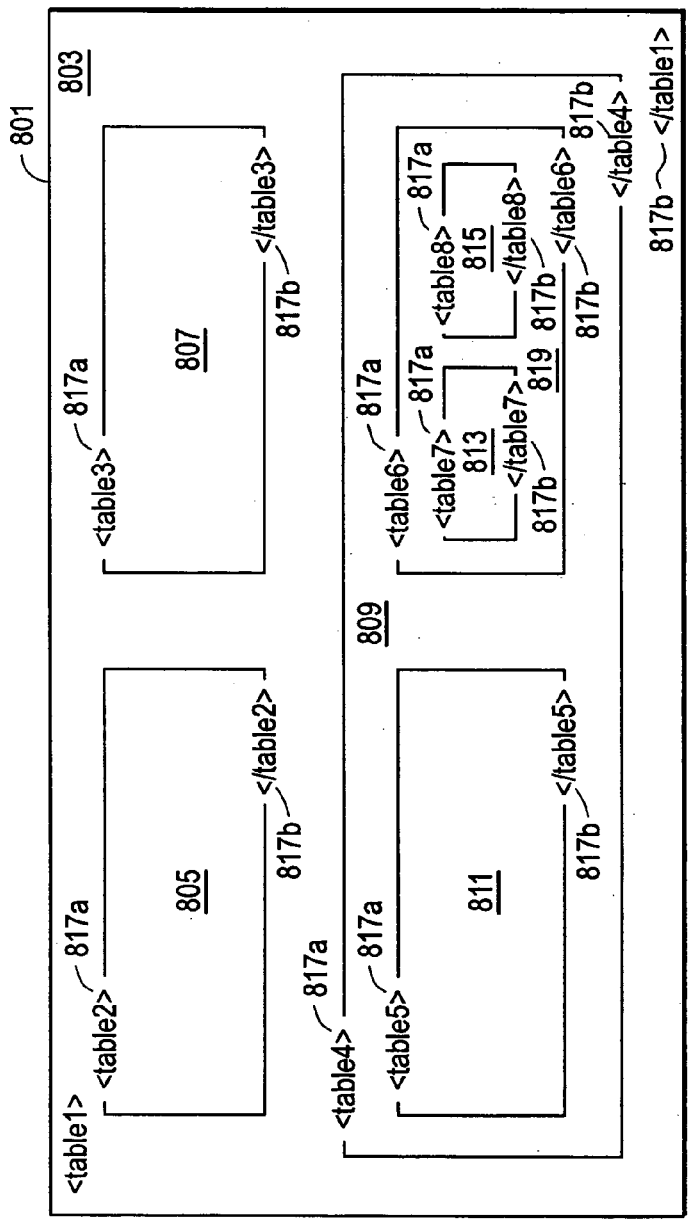
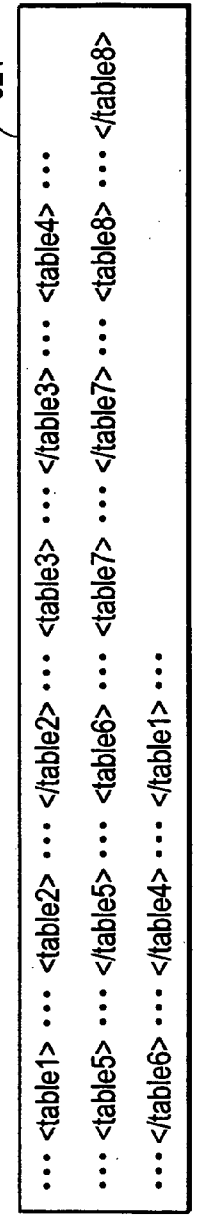
FIG. 8A
FIG. 8B

TRANSLATING TABULAR DATA FORMATTED FOR ONE DISPLAY DEVICE TO A FORMAT FOR DISPLAY ON OTHER DISPLAY DEVICES

CROSS REFERENCE TO RELATED APPLICATIONS

This application is also related to U.S. application Ser. No. 09/883,101, "Apparatus and Method for Supplying Electronic Content to Network Appliances," filed on Jun. 15, 2001, and Provisional Application Ser. No. 60/212,147, entitled "Apparatus and Method for Supplying Electronic Content to Network Appliances," filed on Jun. 16, 2000, the disclosures of which are incorporated herein by this reference.

FIELD OF INVENTION

The present invention relates to methods and systems that support data display on portable computing devices. In particular, embodiments of the invention reformat tabular data developed for display on conventional desktop devices into a format suitable for display on a portable computing device.

BACKGROUND OF THE INVENTION

Portable computing devices have become popular forms of computing systems. Portable computing devices may include handheld computing devices, personal digital assistants ("PDAs"), palmtops, computerized telephones, wireless computing appliances, computerized notebooks, and other such devices. These computing systems typically allow users to access large amounts of information such as an address book, a personal calendar, and a list of to-dos.

Portable computing systems may also include communications equipment configured to retrieve data from remote information sources, such as websites. For example, various software vendors have developed web browsers for Palm OS handheld computing devices. These browsers may provide portable computing devices with fast access to a full range of remote content, such as websites. For example, using a browser and a modem, users of Palm OS handheld computers may access virtually any site on the Internet, not just those sites designed for mobile access. To provide users with a rich, full Internet experience, web browsers for portable computing devices may support color graphics, personalization, bookmarks, and strong security features.

Many remote information sources (e.g., websites) have been designed for display on conventional computing devices. Accordingly, the display of such information sources on portable computing devices may be substandard. In some cases, the portable computing device's display of this remotely originated data may be so poor that the user is unable to interact with the data in a meaningful manner.

FIG. 1A illustrates a web page 110 as it might appear on a conventional computer display monitor 101. The designers of the web page 110 developed the page for display on conventional monitors such as the monitor 101. Accordingly, the web page 110 fits nicely within the boundaries of the display space provided by the monitor 101.

FIG. 1B illustrates how the web page 110 may appear on a portable computing device display monitor 102. The display monitor 102 has different dimensions than the display monitor 101. Moreover, many portable computing device monitors are also smaller than conventional desktop display monitors. Since the web page 110 has been optimized for display on the conventional monitor 101, the web page 110 may have a sub-optimal display on a device with different characteristics. A user of the portable computing device may use a vertical display system comprised of directional arrows 103a, 103b and slider 105a and a horizontal display system comprised of directional arrows 104a, 104b and slider 105b in order to interact with the web page 110. Unfortunately, for some remote data, even vertical and horizontal display systems may be inadequate for enabling the user to make sense of the remote data and interact with it in a timely or meaningful manner.

SUMMARY OF THE INVENTION

Embodiments of the invention may reformat content prepared for display on one device, such as a conventional desktop display monitor, for display on a second device, such as a portable computing device's display monitor. In particular, embodiments of the invention may reformat tabular data incorporated in a given remote data page, such as a page from a website, into a format better suited for display on a portable computing device. Embodiments of the invention provide various display heuristics configured to analyze and reformat tabular data for display on portable computing devices. The display heuristics may be embodied in software executable on various computing devices as well as in various forms of computing hardware.

Embodiments of the invention may provide a method and system of reformatting display data. The display data may be received in a format suitable for displaying on a first display device. The method and system determine whether the received display data contains tabular data and remove tabular formatting from the display data to yield display data suitable for displaying on a second display device, where the second display device has different display dimensions than the first display device.

Embodiments of the invention also may provide a method and system for translating tabular data from a first display format to a second display format. A single row/single column heuristic module examines tabular data and removes tabular formatting from the tabular data if the tabular data contains fewer than two columns or fewer than two rows. A maximum width display heuristic module examines tabular data and removes tabular formatting from the tabular data if the tabular data indicates a horizontal display length exceeding an absolute maximum width allowance. A wide column display heuristic module examines tabular data and removes tabular formatting if the tabular data contains more than one column exceeding a predetermined maximum column width allowance. A nested table display heuristic module examines tabular data, determines if the tabular data includes nested tables, containing an inner table and at least one outer table, and removes tabular formatting from the at least one outer table.

Embodiments of the invention may further provide a system and method for translating tabular data prepared for a first display format into a second display format. For example, the method determines if the tabular data includes nested tables, wherein the nested tables include an inner table and outer tables. Tabular data formatting is removed from the inner table if the inner table contains less than one column or less than one row. The method removes tabular data formatting if the inner table contains more than one column exceeding a first predetermined width allowance. Tabular data formatting may also be removed if the inner table has a horizontal display length greater than a second predetermined width allowance. The method also removes tabular data formatting for the outer tables.

BRIEF DESCRIPTION OF THE DRAWINGS

FIG. 8A illustrates a remote data page containing a remote data table that contains various nested tables.

FIG. 8B illustrates that a heuristic procedure's analysis of the table shown in FIG. 8A may encounter the beginning and end tags for another table before encountering the end tag for the table.

DETAILED DESCRIPTION OF EMBODIMENTS OF THE INVENTION

Embodiments of the invention reformat content prepared for display on one device, such as a conventional desktop display monitor, for display on a second device, such as a portable computing device display monitor. In particular, embodiments of the invention may reformat tabular data incorporated in a given display, such as a page from a website, into a format better suited for display on a portable computing device.

Many remote data pages, such as website pages, contain tabular data provided for organizational purposes (e.g., page layout purposes) rather than tabular data as such. While the tabular formatting may provide a solution to the limitations of particular markup languages (e.g., HTML), the tabular formatting may also produce sub-optimal displays when the tabular data is displayed on a screen other than the one for which it was formatted. For example, a screen comprising tabular data developed for display on a conventional desktop display monitor may appear as a virtually indecipherable behemoth on the smaller screen of a portable computing device, requiring the user to scroll left/right and up/down in order to process the information conveyed. In some circumstances, the user may even be unable to comprehend the web page and/or interact with it in a meaningful manner.

Some tabular formatting can be removed from a remote data page without destroying the integrity of the page and removal of tabular formatting may improve the usefulness of the remote data page when displayed on another device, such as a portable computing device, having a screen of different size and dimensions than the conventional screen for which the tabular data was prepared. Of course, the remote data page may contain some tabular formatting that should be preserved.

Accordingly, various display heuristics may be employed to analyze and reformat tabular data for display on portable computing devices, according to embodiments of the invention. For example, data inherently displayed in a tabular format (e.g., information from a data matrix) should generally be preserved in a tabular format while data prepared in a tabular format for some other reason (e.g., to overcome markup language limitations) should generally not be preserved in a tabular format when displayed on a portable computing device. Because of the differences between conventional display screens and portable computing device screens, and the amount of web page data that uses tabular data merely for formatting purposes, the display re-formatting heuristics may generally be biased towards removing tabular display formats, according to an embodiment of the invention. Of course, tabular formats will be retained in some circumstances. Embodiments of the invention may express these display heuristics in software executable on various computing devices as well as in various forms of computing hardware.

Figure 1A:
FIG. 1A illustrates a web page as it might appear on a conventional computer display monitor.
Figure 1B:
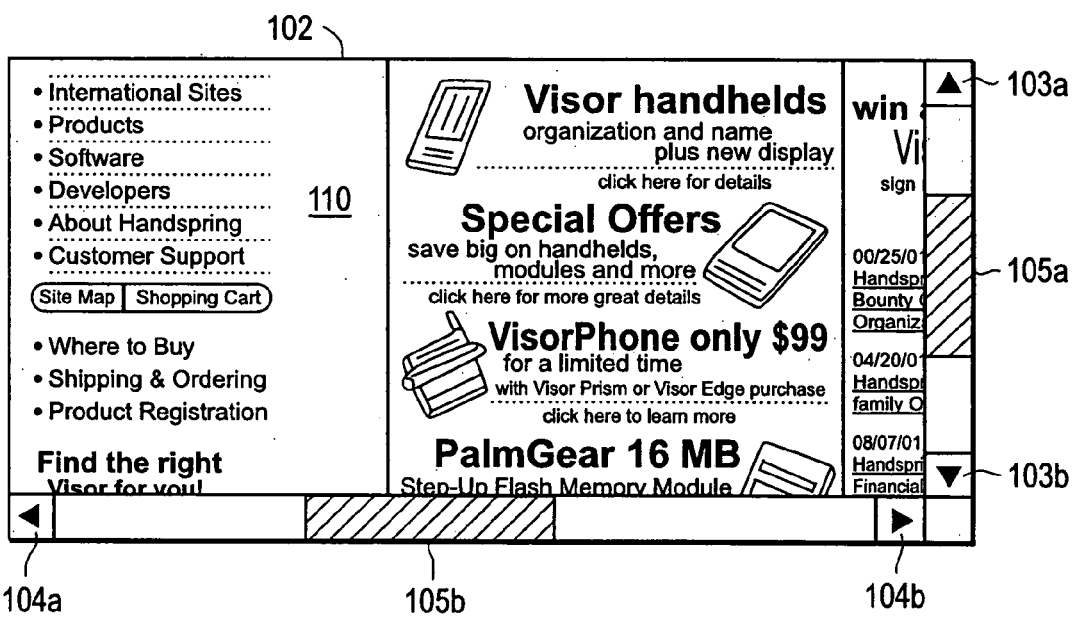
FIG. 1B illustrates how the web page may appear on a portable computing device display monitor.
Figure 2:
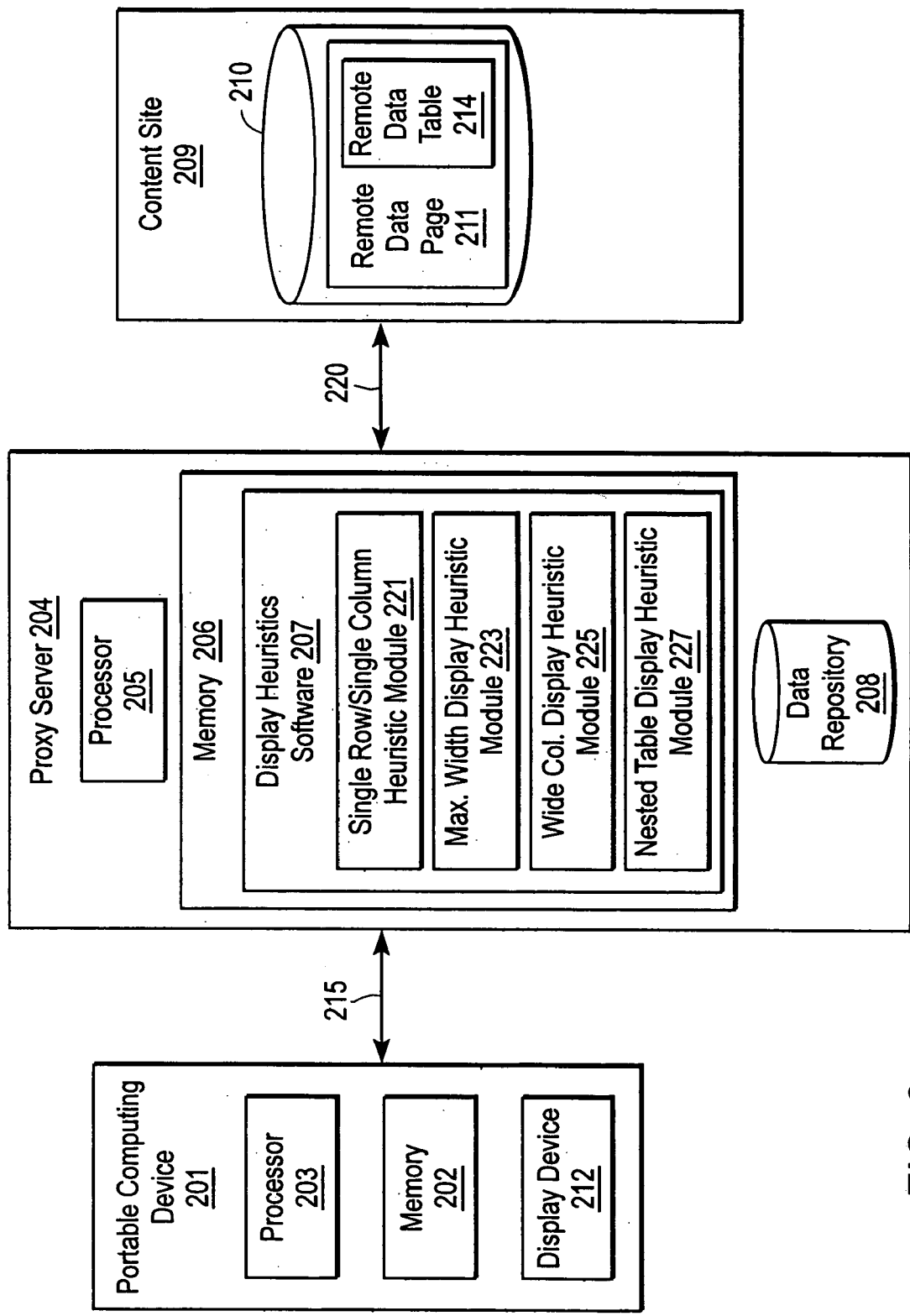
FIG. 2 is a block diagram of a proxy server having display heuristics software for enhancing display of a remote data page on a portable computing device, according to an embodiment of the invention.

FIG. 2 is a block diagram of a proxy server 204 having display heuristics software 207 for enhancing display of a remote data page 211 on a portable computing device 201, according to an embodiment of the invention. The proxy server 204 includes a processor 205 (e.g., a CPU), a memory 206, and a data repository 208. The memory 206 includes the display heuristics software 207 that has been configured to examine and reformat tabular data for display on the portable computing device 201. The content site 209 (e.g., a web server) typically includes a data repository 210 that contains the remote data page 211 (e.g., a web page) that may be requested by a user associated with the portable computing device 201.

The display heuristics software 207 includes various modules, such as a single row/single column heuristic module 221, a maximum width display heuristic module 223, a wide column display heuristic module 225, and a nested table display heuristic module 227. The display heuristics software 207 may examine a remote data table 214 included in the remote data page 211 and reformat the remote data table 214, if necessary, to enhance its display on the portable computing device 201.

The proxy server processor 205 executes instructions contained in the display heuristics software 207. The memory 206 may comprise any type of memory device such as RAM, ROM, flash, cache, EEPROM, magnetic, bubble, optical, etc. The memory 206 may retrieve the display heuristics software 207 from a data repository 208 that has been configured to retain information on a permanent or semi-permanent basis.

The portable computing device 201 may include a processor 203 (e.g., a CPU), a memory 202, and a display device 212. The portable computing device 201 may represent a handheld computing device, a personal digital assistant ("PDA"), a palmtop, a computerized telephone, a wireless computing appliance, a computerized notebook, and/or other such similar devices.

A user associated with the portable computing device 201 may request the remote 13 data page 211. The processor 203 sends a request across a network 215 to the proxy server 204. The network 215 may represent a wireless network, for example. The proxy server 204, via the processor 205, sends the user's request for the remote data page 211 across a network 220 to the content site 209. The network 220 may represent an electronic network such as the Internet, for example.

The proxy server 204 receives the remote data page 211 from the content site 209. The remote data page 211 may contain tabular data, such as the remote data table 214, whose unaltered display on the portable computing device's display device 212 might be sub-optimal. Accordingly, the display heuristics software 207 examines the tabular data contained in the remote data table 214 and may reformat the tabular data before the proxy server 204 sends the remote data table 214 to the portable computing device 201 for display to the user.

The display heuristics software 207 may be included in other software operating on the proxy server 204. For example, the display heuristics software 207 may be included in a content transformation module ("CTM") (not shown) operating on the proxy server 204. A CTM typically applies various rules to the remote data page 211 to optimize its viewing on the display device 212 of the portable computing device 201. For example, the CTM may perform tasks such as stripping out extra white space by removing extra line break tags (e.g., "<BR>"), changing line breaks to paragraph tags, stripping out empty paragraph tags, stripping out line break tags at the beginning or end of table cells, and other such tasks. In addition, the CTM may include the display heuristics software 207. Of course, the display heuristics software 207 need not be contained within other software such as the CTM.

The display heuristics software 207 may perform a number of tasks in examining tabular data contained in the remote data page 211. The display heuristics software's various modules (e.g., the single row/single column heuristic module 221) may be configured to operate in various orders. For example, the display heuristics software 207 may first execute the single row/single column heuristic module 221 that determines if tabular data contains just one row or one column, and if so, removes the tabular formatting. The display heuristics software 207 may then execute the maximum width display heuristic module 223 that determines if the tabular data exceeds a specified width, and if so, removes the tabular formatting. The display heuristics software 207 may next execute the wide column display heuristic module 225 that determines if the tabular data contains more than one column exceeding a particular width, and if so, removes the tabular formatting. Finally, the display heuristic software 207 may execute a nested table display heuristic module 227 that locates the innermost table from a collection of nested tables and removes the tabular formatting from all but the innermost table. Of course, other embodiments of the invention may execute these heuristics in other orders. Similarly, embodiments of the invention may execute less than all of the heuristics disclosed herein, while still other embodiments of the invention may execute additional heuristics. Since the display heuristics software 207 may execute several different heuristics before completing examination of the remote data page 211, the display heuristics software 207 may need to retain some data regarding the remote data page 211 in a memory (e.g., in the memory 206).

Figure 3:
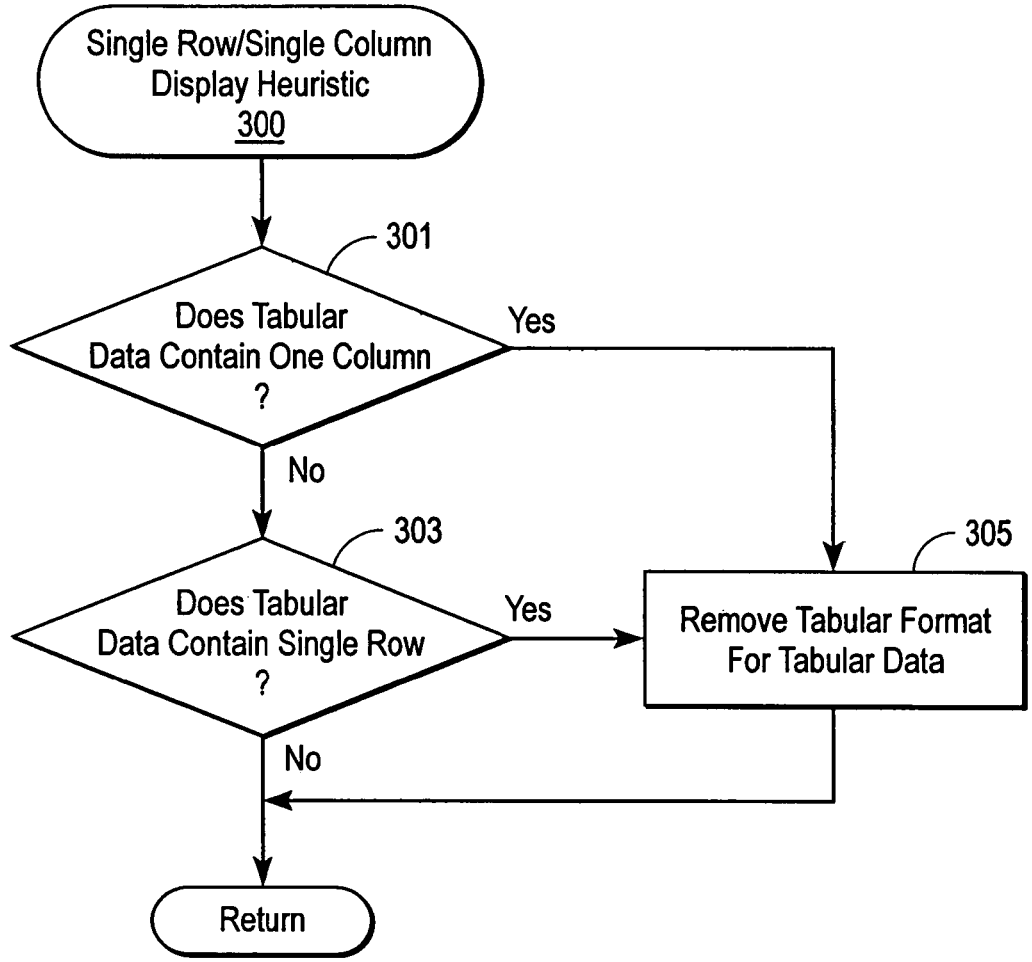
FIG. 3 is a flowchart for a single row, single column display heuristic procedure that may be included in the display heuristics software, according to an embodiment of the invention.

FIG. 3 is a flowchart for a single row, single column display heuristic procedure 300 that may be included in the display heuristics software 207 (e.g., the single row/single column heuristic module 221 shown in FIG. 2), according to an embodiment of the invention. The heuristic procedure 300 first determines if the tabular data from a remote data page (e.g., the remote data table 214 in the remote data page 211) contains more than one column (step 301). If the tabular data contains more than one column (step 301), then the heuristic procedure 300 removes the table format from the tabular data (step 305). Removing the tabular format may also be known as "unrolling" the table and/or "linearizing" the table. The actual removal procedure typically comprises removing any table markers from the remote tabular data indicative of a tabular display and/or that provide information regarding a tabular display. If the tabular data does not contain more than one column (step 301), then the procedure 300 determines if the tabular data contains a single row (step 303). If the tabular data contains only a single row (step 303), then the heuristic procedure 300 removes the table format from the tabular data (step 305) and then terminates. If the table contains more than a single row (step 303), then the procedure 300 terminates. Of course, in an alternate embodiment, the heuristic procedure 300 could determine whether the tabular data contains more than one row prior to determining if the tabular data contains more than one column.

Figure 4:
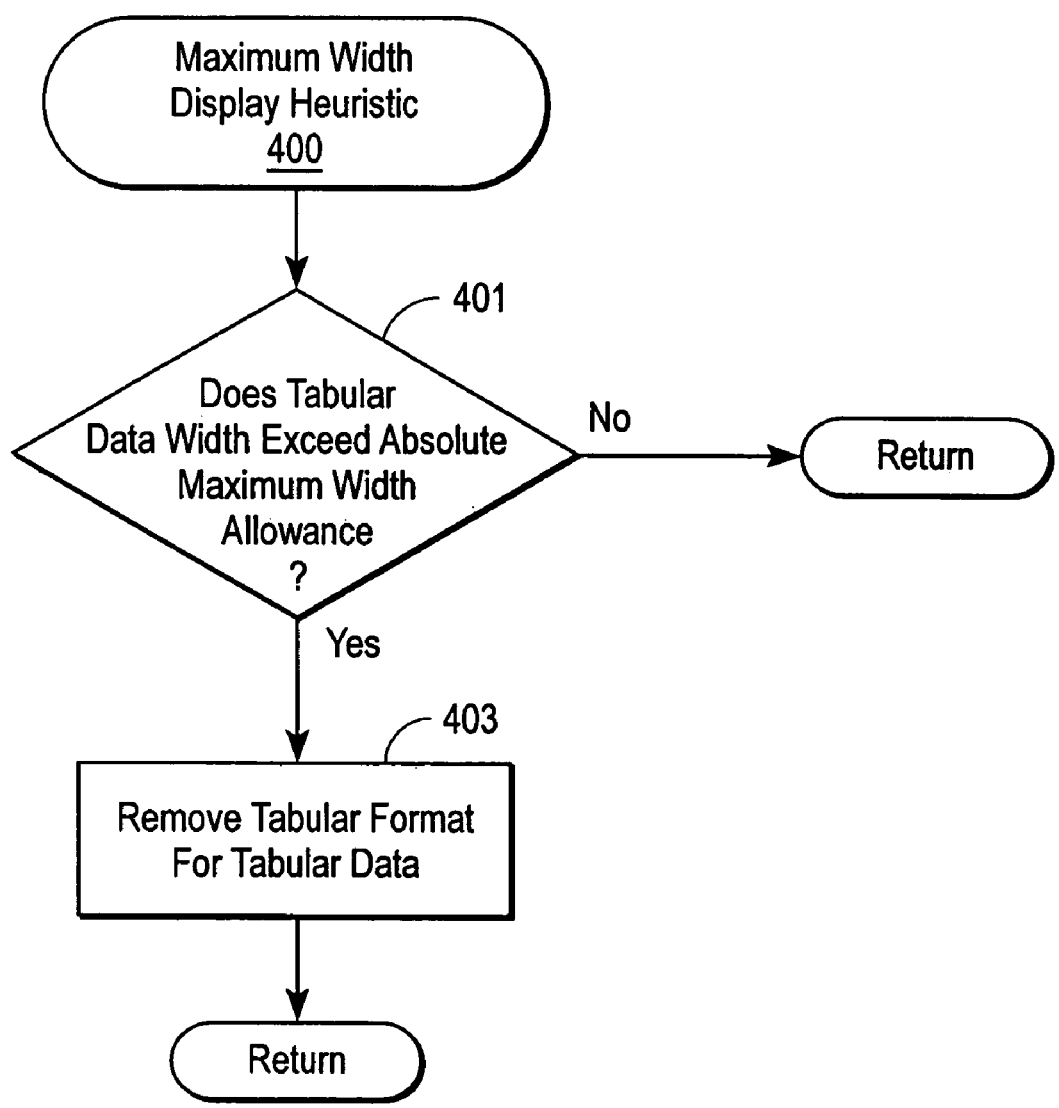
FIG. 4 is a flowchart for a maximum width display heuristic that may be included in the display heuristics software, according to an embodiment of the invention.

FIG. 4 is a flowchart for a maximum width display heuristic 400 that may be included in the display heuristics software 207 (e.g., the maximum width display heuristic module 223 shown in FIG. 2), according to an embodiment of the invention. The heuristic procedure 400 determines whether the tabular data located in a remote data page (e.g., the remote data table 214) will have a display that exceeds an absolute maximum width allowance (step 401). If the tabular data does not exceed the absolute maximum width allowance (step 401), then the heuristic procedure 400 terminates. If the tabular data exceeds the absolute maximum width allowance (step 401), then the heuristic procedure 400 removes the tabular format from the tabular data (step 403).

A different absolute maximum width allowance may be appropriate for different display devices (e.g., the display device 212). For example, a preferred absolute maximum width for many models of Handspring Visor computers is 350 pixels. The absolute maximum width allowance may be selected based upon a number of factors, such as minimizing the amount of vertical scrolling that must be performed by the user in order to review the remote data page (e.g., the remote data page 211) as displayed.

Figure 5:
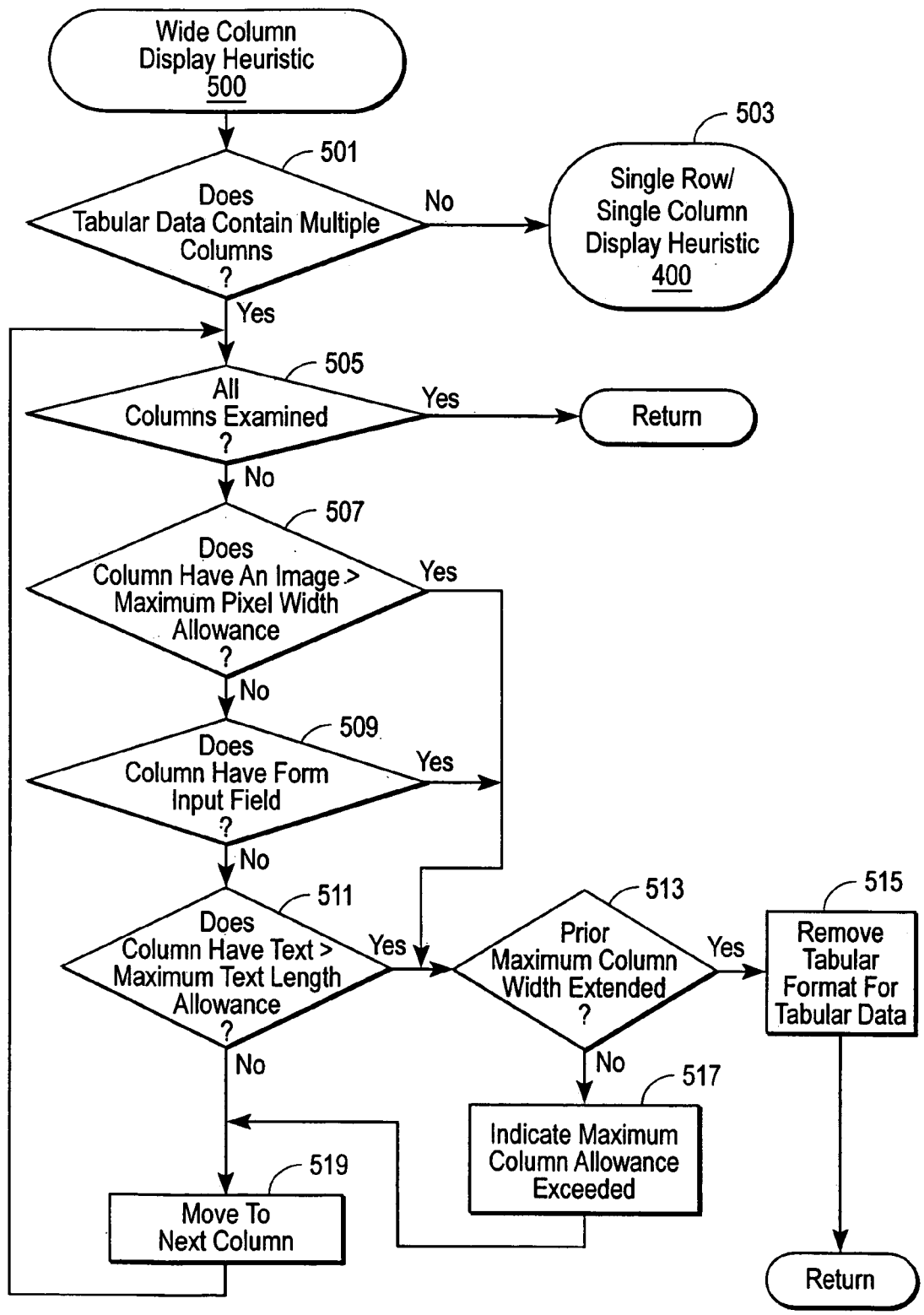
FIG. 5 is a flowchart for a wide column display heuristic that may be included in the display heuristics software, according to an embodiment of the invention.

FIG. 5 is a flowchart for a wide column display heuristic 500 that may be included in the display heuristics software 207 (e.g., the wide column display heuristic module 225 shown in FIG. 2), according to an embodiment of the invention. The procedure 500 determines if tabular data (e.g., the remote data table 214) contains multiple columns (step 501). If the tabular data contains only a single column (step 501), then a single row single column display heuristic (e.g., the heuristic procedure 300 shown in FIG. 3) is invoked (step 503). If the tabular data contains multiple columns (step 501), then the heuristic procedure 500 determines if all columns have been examined to determine if one or more of the columns exceeds a maximum column width allowance based upon various characteristics such as a maximum pixel width allowance and a maximum text length allowance (step 505). If all columns have been examined (step 505), then the procedure terminates.

If all columns have not been examined (step 505), then the heuristic procedure 500 determines if the column being examined contains an image exceeding a maximum pixel width allowance (step 507). The maximum pixel width allowance may be selected based upon a number of factors, such as minimizing the amount of horizontal scrolling that must be performed by the user in order to review the remote data page (e.g., the remote data page 211) as displayed. For example, a preferred maximum pixel width allowance for many models of Handspring Visor computers is 120 pixels. If the column contains an image exceeding the maximum pixel width allowance (step 507), then the heuristic procedure 500 determines if a previous column in the table has exceeded the maximum column width allowance (step 513). If a previous column has exceeded the maximum column width allowance (step 513), then the heuristic procedure 500 removes the tabular format from the tabular data (step 515). If a previous column has not exceeded the maximum column width allowance (step 513), then the heuristic procedure 500 makes an indication that a table column has exceeded the maximum column width allowance (step 517). The procedure 500 then examines the next column in the table (step 519).

If the column does not contain an image exceeding the maximum pixel width allowance (step 507), then the procedure 500 determines if the column being examined contains a form input field (step 509). A form input field conventionally provides a mechanism for a user to enter information (e.g., "submit your PIN number here.") If the column contains a form input field (step 507), then the procedure 500 determines if the maximum column width allowance has previously been exceeded (step 513). If the maximum column allowance has previously been exceeded (step 513), then the heuristic procedure 500 removes the tabular format from the tabular data (step 515). If the heuristic procedure 500 has not previously recorded that a column in the table has exceeded the maximum column width allowance (step 513), then the procedure 500 makes an indication that the maximum column allowance has been exceeded (step 517). The heuristic procedure 500 then examines the next column in the table (step 519).

If the heuristic procedure 500 determines that the column does not contain a form input field (step 509), then the heuristic procedure 500 determines if the column contains text exceeding a maximum text length allowance (step 519). The maximum text length allowance may be selected based upon a number of factors, such as minimizing the amount of vertical scrolling that must be performed by the user in order to review the remote data page (e.g., the remote data page 211) as displayed. For example, a preferred maximum text length allowance for many models of Handspring Visor computers is 40 characters. If the column contains text in excess of the maximum text length allowance (step 511), then the heuristic procedure 500 determines if the maximum column width allowance has been previously exceeded (step 513). If the maximum column width allowance has been previously exceeded (step 513), then the heuristic procedure 500 removes the tabular format from the tabular data (step 515). If the maximum column width allowance has not been previously exceeded (step 513), then the heuristic procedure 500 makes an indication that the maximum column width allowance has been exceeded (step 517). The heuristic procedure 500 examines the next column in the table (step 519).

Of course, some steps of the heuristic procedure 500 could be performed in another order without changing the outcome of procedure's analysis of the tabular data. For example, steps 507, 509, and 511 could be performed in any order. Moreover, in an alternate embodiment of the invention, one or more of these steps could be eliminated. For example, form input fields may be determined to have a minimal negative impact on display for some portable computing devices such that they would not be automatically considered to exceed the maximum column width allowance, e.g., excessively long form input fields could be detected by other heuristics such as the maximum width display heuristic procedure 400 shown in FIG. 4.

Figure 6A:
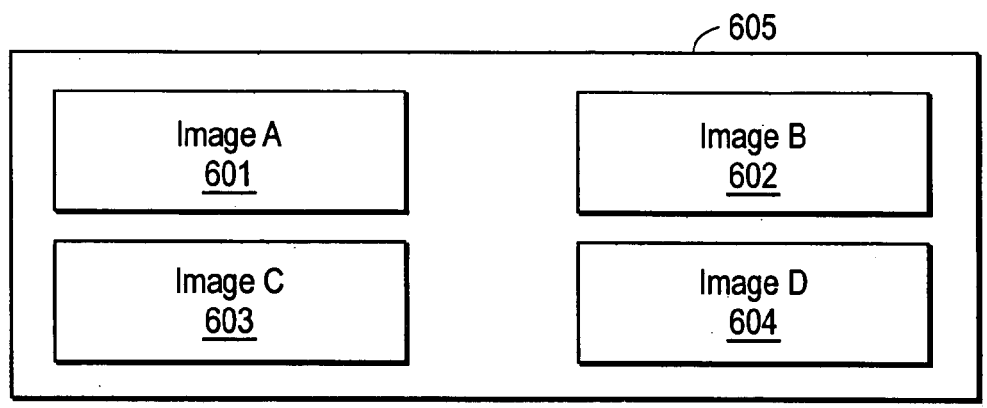
FIG. 6A illustrates how a remote data table containing four large images would be displayed on a conventional display device.
Figure 6B:
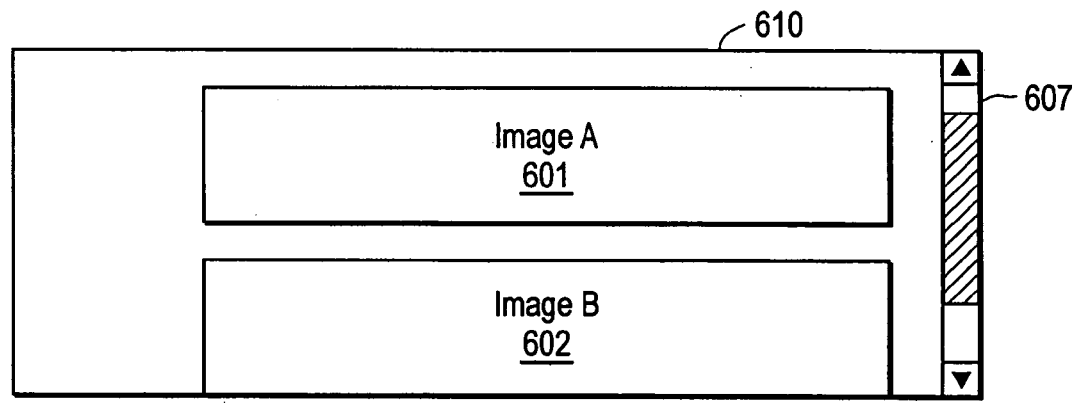
FIG. 6B illustrates how the four large images shown in FIG. 6A would be appear on a portable computing display device after analysis of the remote data table by a display heuristic, according to an embodiment of the invention.

FIG. 6A illustrates how a remote data table 600 (e.g., a table in a web page) containing four large images 601–604 would be displayed on a conventional display device 605. In the remote data table 600, the images 601–604 have been marked for display in a grid, typically because the table's designers believed that the images 601–604 would fit within the boundaries of the conventional display device 605. However, the remote data table 600 and its large images 601–604 might not display as well on a portable computing display device, in part because of the device's different dimensions and smaller size. Accordingly, FIG. 6B illustrates how the images 601–604 would be appear on a portable computing display device 610 after analysis of the remote data table 600 by a display heuristic, such as the wide column display heuristic 500 illustrated in FIG. 5. As shown in FIG. 6B, the display heuristic has removed the tabular formatting for the images 601–604 because their size has exceeded one or more display allowances. As a result, the device 610 displays the images 601–604 individually rather than grouped as a table. While the portable computing device's user may have to manipulate a vertical sliding mechanism 607 in order to see all four images 601–604, the user may not also require a horizontal sliding mechanism in order to see the images. Thus, the images 601–604 should be provided to the user in a more intuitive and easy-to-use manner. Of course, in some instances, the user may still require some form of horizontal sliding mechanism, but heuristics procedures, such as the wide column display heuristic 500 shown in FIG. 5, may generally simplify the display of remote data on portable computing devices.

Figure 7:
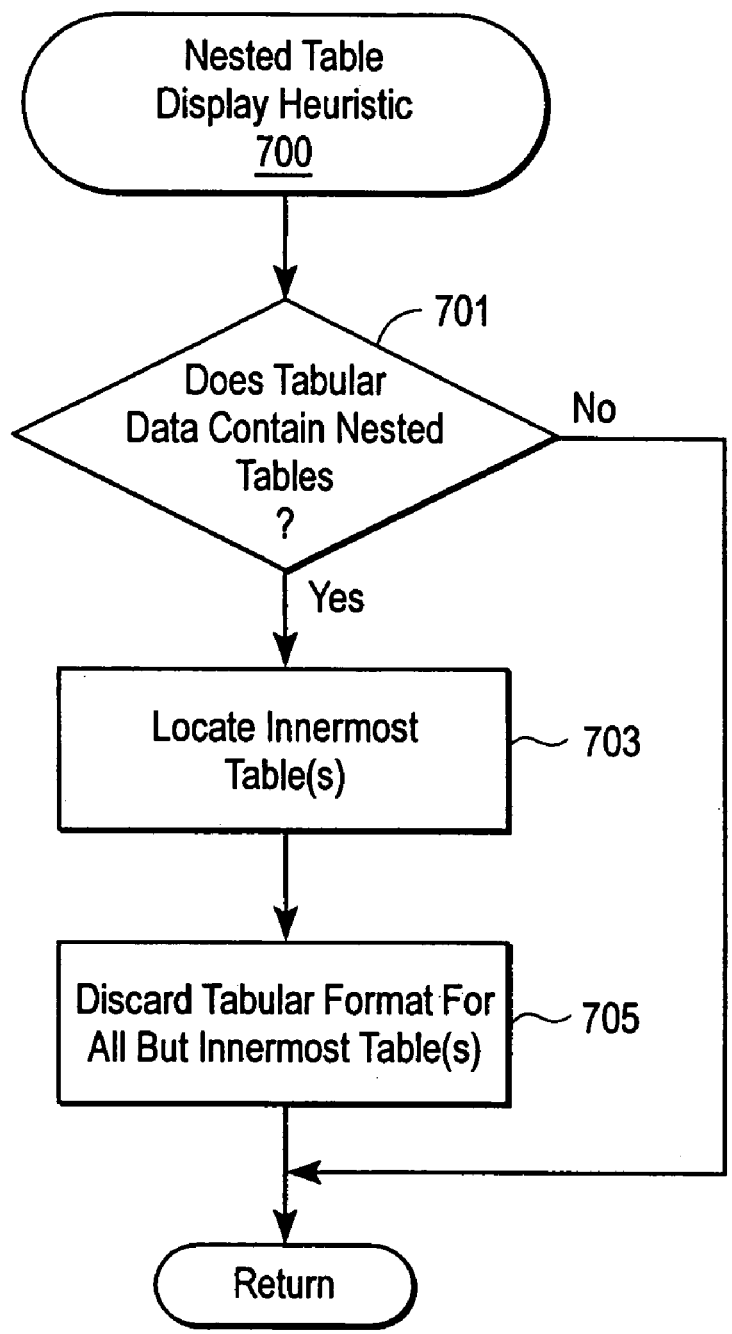
FIG. 7 is a flowchart for a nested table display heuristic that may be included in the display heuristics software, according to an embodiment of the invention.

FIG. 7 is a flowchart for a nested table display heuristic 700 that may be included in the display heuristics software 207 (e.g., the nested table display heuristic module 227), according to an embodiment of the invention. The heuristic procedure 700 determines if tabular data contains nested tables (step 701). If the tabular data does not contain nested tables (step 701), then the tabular data may retain its tabular format, although the tabular formatting may be removed by other display heuristics procedures. If the tabular data contains nested tables (step 701), then the heuristic procedure 700 locates the innermost table(s) (step 703). The heuristic procedure 700 may employ a recursive technique in order to locate the innermost table(s). The heuristic procedure 700 discards the tabular format for all but the innermost table(s) (step 705). Of course, the innermost table(s) may be examined by other display heuristic procedures, which may remove the tabular formatting for these tables.

FIG. 8A illustrates remote data page 801 (e.g., a web page) containing a remote data table 803 that itself contains various nested tables 805–819. For example, the table 815 is a nested tabled within the table 819, which itself is a nested table within the table 809, which is itself a nested table within the table 803. Thus, the innermost table of this tabular series is the table 815. Application of the heuristic procedure 700 to the tables 803, 809, 819, and 815 would result in the removal of the tabular formatting for the tables 803, 809, and 819. The table 815 would retain its tabular formatting, according to the heuristic procedure 700, although the table 815 might lose its tabular formatting by application of another heuristic procedure, such as the wide column display heuristic procedure 500 shown in FIG. 5.

A tabular format may be indicated in a variety of ways, but such formatting is typically indicated by the use of a start tag (e.g., start tag 817a) and an end tag (e.g., end tag 817b). Removal of the tabular formatting typically involves removing the start tag and end tag for the tabular data. Once the tabular formatting has been removed, then other display software may process the formerly tabular data. As previously mentioned, the heuristic procedures employed by the display heuristics software 207 may require that some data about tables be retained during processing. In analyzing a tabular data, a heuristic procedure may encounter the end tag for a given table following the beginning and ending tags of other tables. For example, as shown in FIG. 8B, a heuristic procedure's analysis of the table 803 ("table 1") would typically encounter the start and end tags for the table 811 ("table 5") before encountering the end tag for the table 803. Accordingly, the heuristic procedure 700 may need to retain some information in memory about the tabular data during its processing.

Figure 9A:
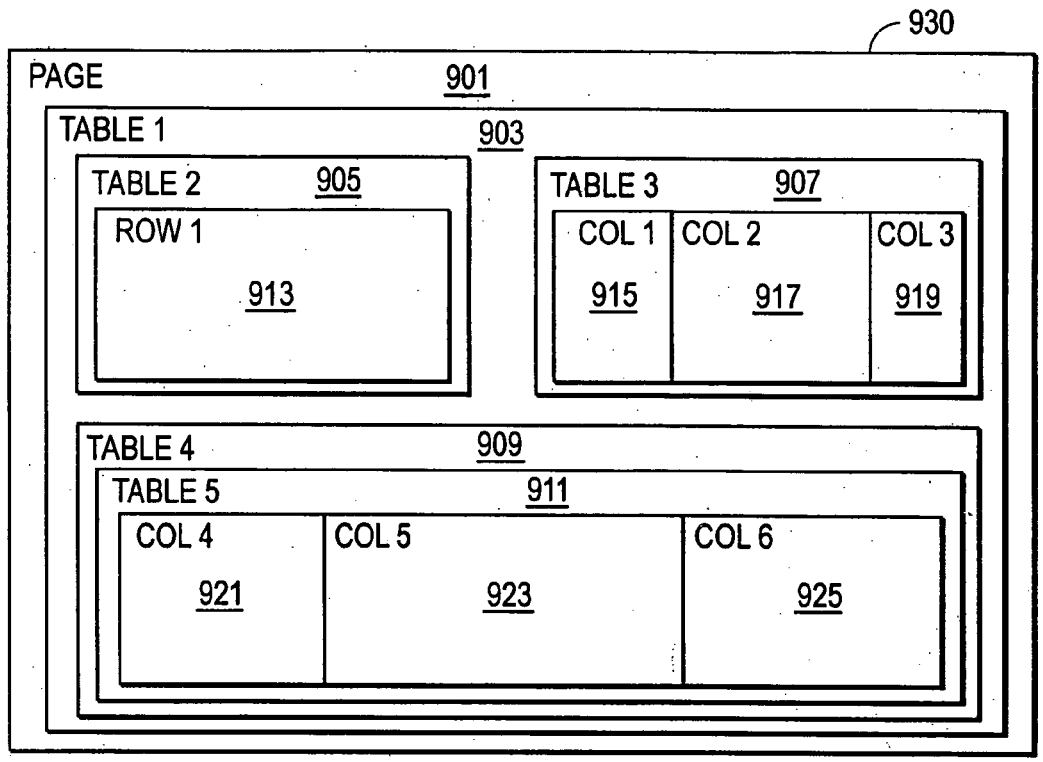
FIG. 9A illustrates a remote data page containing a remote data table that itself contains several nested tables as it would be displayed on a conventional display.
Figure 9B:
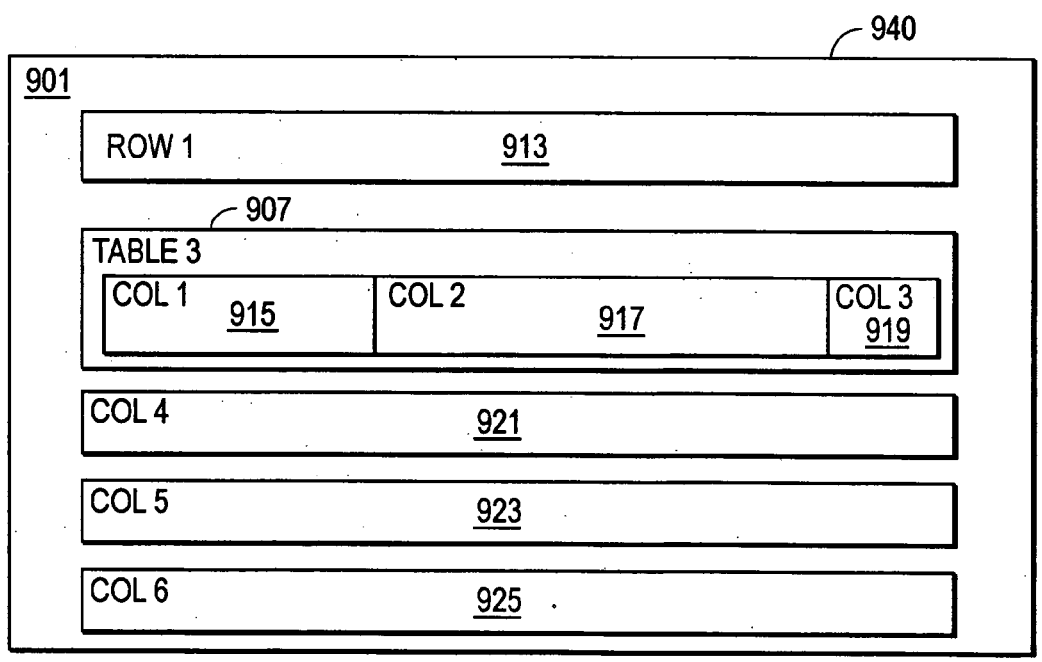
FIG. 9B illustrates the remote data page shown in FIG. 9A as it would be displayed on a portable computing device display following analysis by display heuristics software, according to an embodiment of the invention.

FIG. 9A illustrates a remote data page 901 containing a remote data table 903 that itself contains several nested tables 905–911 as it would be displayed on a conventional display 930. FIG. 9B illustrates the remote data page 901 as it would be displayed on a portable computing device display 940 following analysis by display heuristics software (e.g., the display heuristics software 207), according to an embodiment of the invention. As previously discussed, the heuristic display procedures may typically be applied in a variety of orders. Application of a single row/single column heuristic (e.g., the single row/single column display heuristic procedure 300 shown in FIG. 3) would remove the tabular data formatting for the table 905 since this table contains only a single row 913. Application of a maximum display width heuristic (e.g., the maximum display width heuristic procedure 400 shown in FIG. 4) might determine that no individual table had a width exceeding the amount allowed. However, application of a wide column display heuristic (e.g., the wide column display heuristic procedure 500 shown in FIG. 5) would remove the tabular formatting for the table 911 because both column 921 and column 923 exceeded the maximum column width allowance. This heuristic may likewise permit retention of the tabular formatting for the table 907 since only one column (e.g., a column 917) may exceed the maximum column width allowance. Application of a nested table display heuristic (e.g., the nested table display heuristic procedure 700 shown in FIG. 7) removes tabular formatting for table 903, table 909, and table 909. With the remote data page 901 reformatted by the display heuristic software, the content of the remote data page 901 can be processed by other software associated with the display of the remote data page on the portable computing device display 940.

Figure 10A:
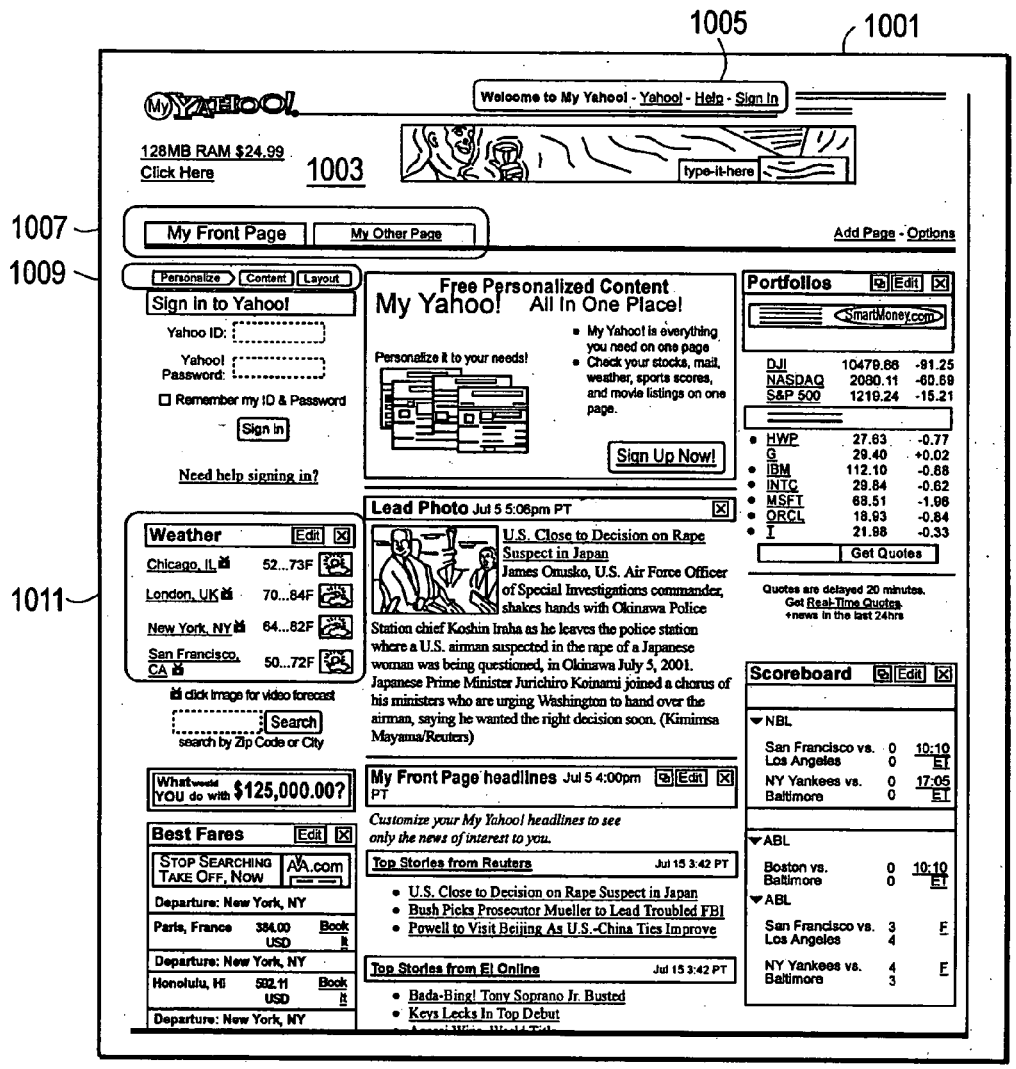
FIG. 10A illustrates a remote data page as it might appear on a conventional display monitor.

FIG. 10A illustrates a remote data page 1003 (e.g., a web page) as it might appear on a conventional display monitor 1001. The designers of the remote data page 1003 may have even developed the page mindful of the characteristics of the monitor 1001, such as the dimensions of its display area. Accordingly, the page 1003 fits nicely within the boundaries of the display space provided by the monitor 1001. The page 1003 contains several instances of tabular data. Included among the tabular data are a welcome table 1005, a my page table 1007, a personalization table 1009, and a nested weather table 1011. The page 1003 likely contains other tabular data in addition to the tables identified above.

Figure 10B:
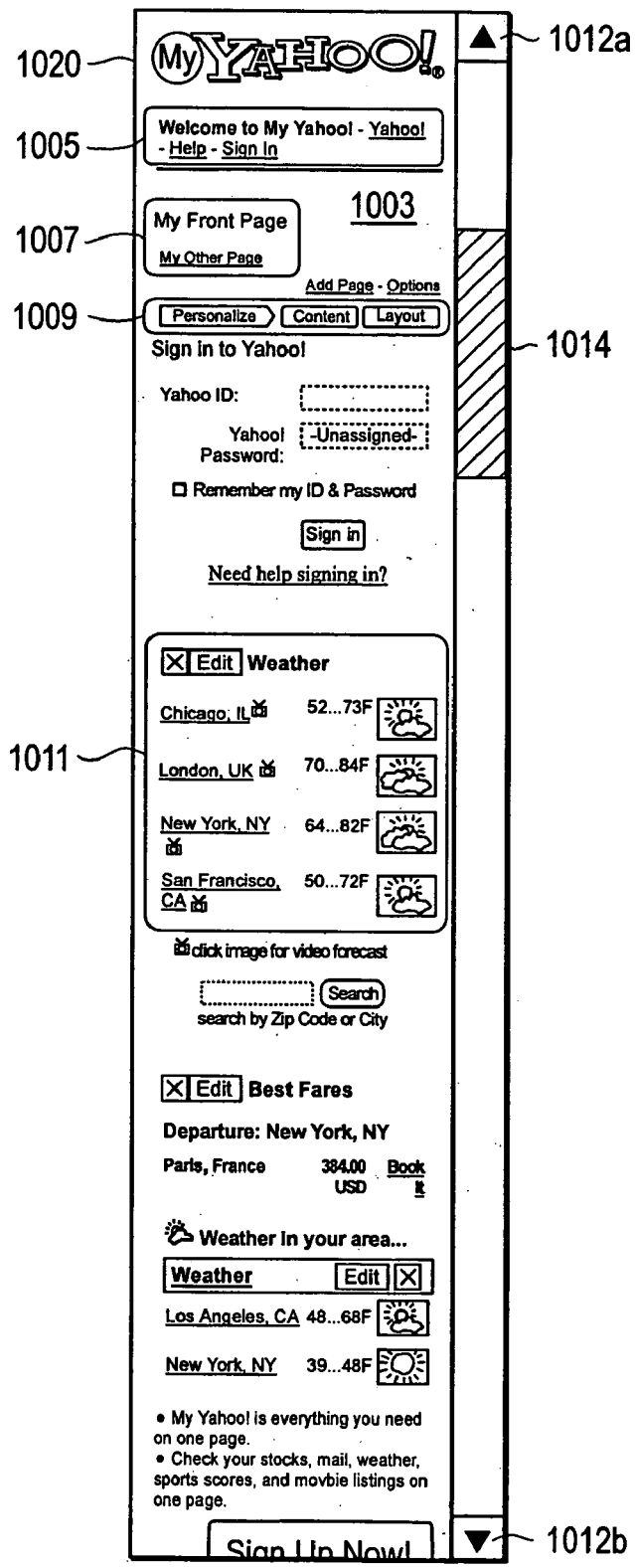
FIG. 10B illustrates how the remote data page may appear on a portable computing device display monitor following analysis by display heuristic software, according to an embodiment of the invention.

FIG. 10B illustrates how the remote data page 1003 may appear on a portable computing device display monitor 1020 following analysis by display heuristic software (e.g., the display heuristic software 207), according to an embodiment of the invention. The monitor 1020 has a display area smaller than the display area of the monitor 1001. The page 1003 extends beyond the bottom edge of the monitor 1020. Accordingly, a user viewing the monitor 1020 may engage a vertical display system comprised of directional arrows 1012a, 1012b and a slider 1014 in order to interact with the page 1003. The user may navigate fairly quickly through the page 1003 using the slider 1014, for example, and does not need to operate a horizontal sliding system in this embodiment.

Analysis of the welcome table 1005 by the display heuristic software's maximum width display heuristic module (e.g., the maximum width display heuristic module 223) indicates that the table 1005 exceeds the absolute maximum width allowance. Accordingly, the table 1005 loses its tabular formatting when displayed on the monitor 1020 and is consequently displayed on multiple rows.

Analysis of the my page table 1007 by the display heuristic software's wide column display heuristic module (e.g., the wide column display heuristic module 225) indicates that the table 1007 contains more than one column exceeding the maximum column width allowance. Accordingly, the table 1007 loses its tabular formatting when displayed on the monitor 1020 and is consequently displayed on multiple rows.

The wide column display heuristic module's analysis of the personalization table 1009 does not find more than one column exceeding the maximum column width allowance, thus the module does not remove the tabular formatting. Likewise, the display heuristic software's other modules also find that the table 1009 exceeds no other allowances or settings and allow the table to retain its tabular formatting on the monitor 1020.

Analysis of the nested weather table 1011 by the display heuristic software's nested table display heuristic module (e.g., the nested table display heuristic module 227) indicates that the table 1011 contains one or more nested tables. Accordingly, the table 1011 loses its outer tabular formatting but retains its inner tabular formatting (e.g., the table matching cities with temperatures and forecast pictures). The display heuristic software's other modules find that the inner table exceeds no other allowances or settings, and the inner table is allowed to retain its tabular formatting on the monitor 1020.

The remote data page 1003 may appear differently on the monitor 1001 and the monitor 1020 for reasons other than the display heuristics software, as previously discussed. For example, the proxy server and the portable computing device may both contain additional software that alter the display of the remote data page 1003 and the page's tabular data, according to an embodiment of the invention.

Figure 11A:
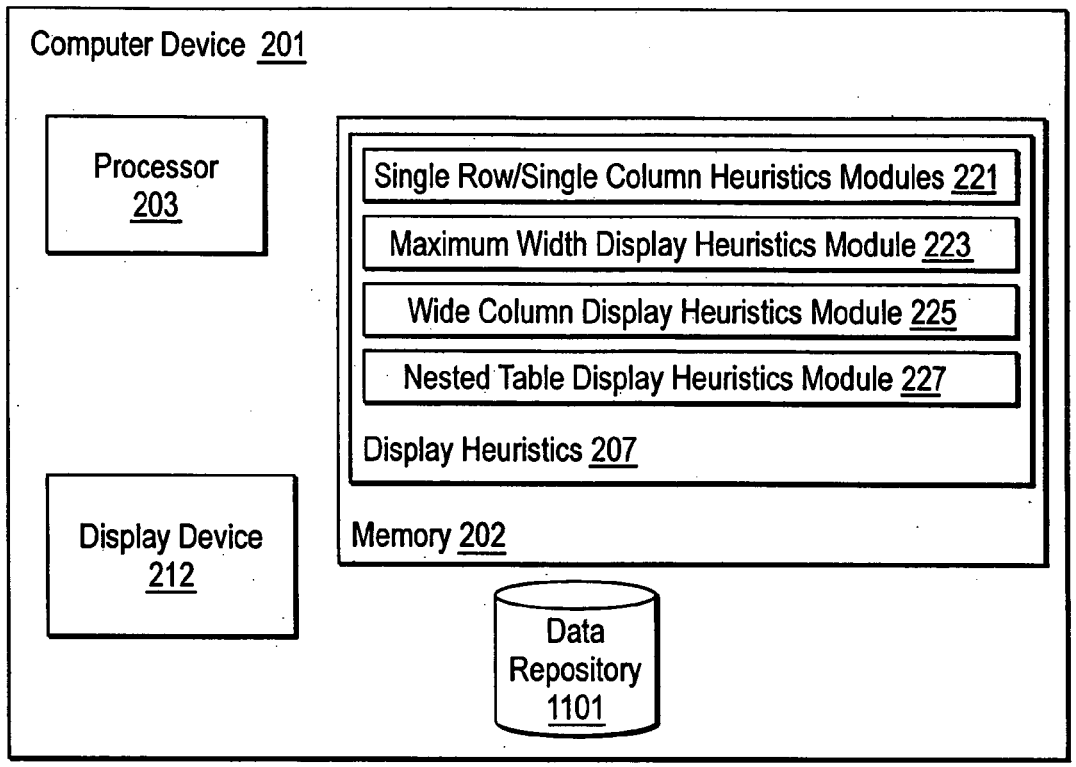
FIG. 11A is a block diagram illustrating display heuristics software 207 executing on the portable computing device 201, according to an alternative embodiment of the invention.

FIG. 11A is a block diagram illustrating display heuristics software 207 executing on the portable computing device 201, according to an alternative embodiment of the invention. The display heuristics software 207 may function directly on the portable computer device 201. Of course, some portable computing devices may have limited processors and/or limited memories such that the heuristic software would operate more efficiently from a proxy server as described in FIG. 2A. However, this need not always be the case, and over time, employing display heuristics software on proxy servers may become less prevalent. Likewise, the bandwidth of the electronic network over which the portable computing device 201 communicates with the content site 209 may be limited such that presentation of the remote data page 211 on the portable computing device 201 may function more efficiently if the display heuristics software 207 operates from a proxy server. Nevertheless, the display heuristics software 207 may be located on the portable computing device 201 itself.

Figure 11B:
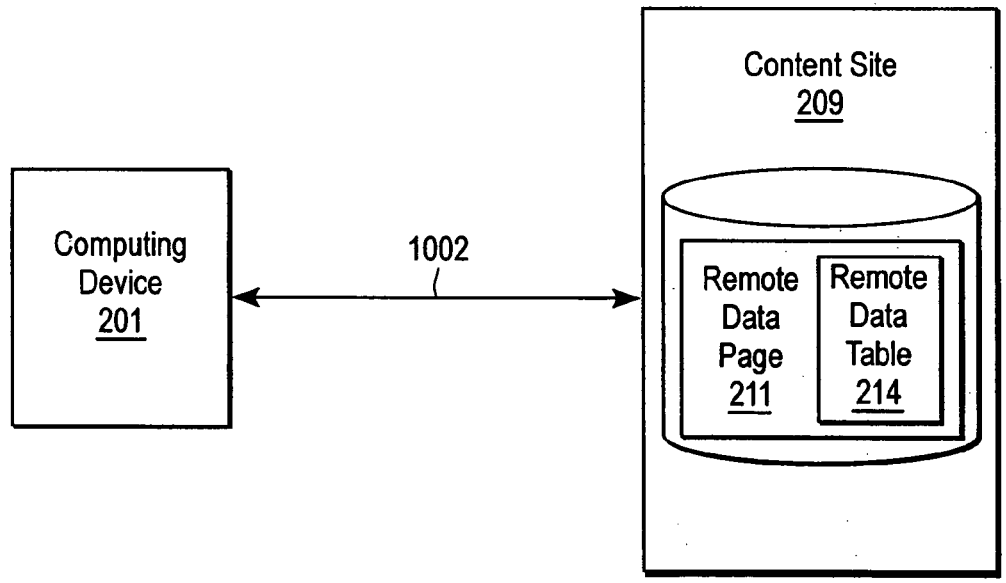
FIG. 11B is a block diagram illustrating a portable computing device communicating directly with a content site to request a remote data page, according to an embodiment of the invention.

FIG. 11B represents an alternative embodiment of the invention in which the portable computing device 201 directly retrieves the remote data page 211 from the content site 211 via electronic network 1102 (e.g., without the assistance of the proxy server 204). In such embodiments, the display heuristics software 207 would likely be located on the portable computing device 201. Of course, the display heuristics software 207 could also be located on the content site 209 if the content site was aware of the characteristics of the portable computing device's display.

Figure 12:
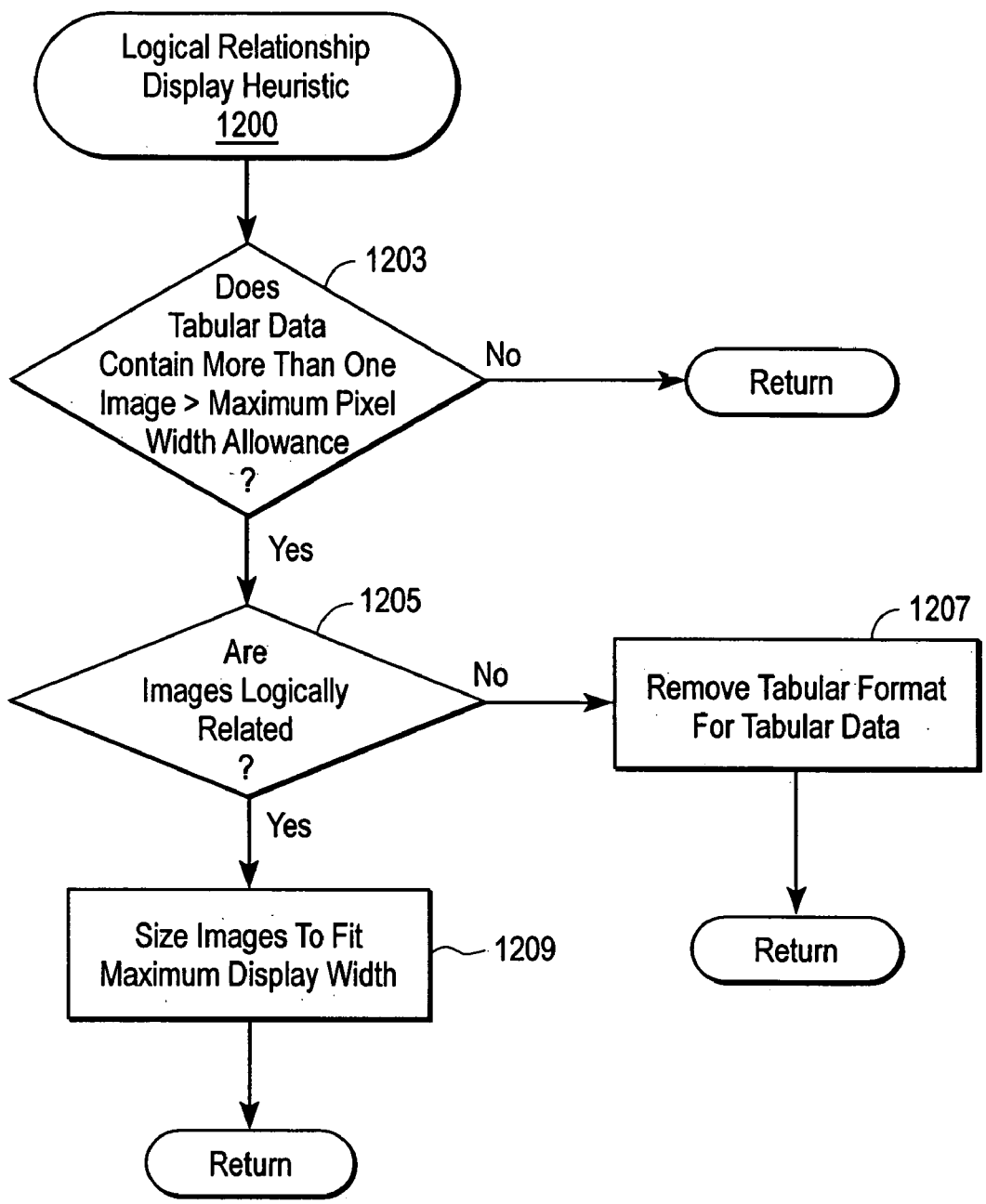
FIG. 12 is a flowchart for a logical relationship display heuristic procedure that may be included in the display heuristics software, according to an alternate embodiment of the invention.

FIG. 12 is a flowchart for a logical relationship display heuristic procedure 1200 that may be included in the display heuristics software 207, according to an alternate embodiment of the invention. The heuristic procedure 1200 determines if tabular data contains more than one image exceeding a maximum pixel width allowance (step 1203). The maximum pixel width allowance may be selected based upon a number of factors, such as minimizing the amount of horizontal scrolling that must be performed by the user in order to review the remote data page (e.g., the remote data page 211) as displayed. For example, a preferred maximum pixel width allowance for many models of Handspring Visor computers is 120 pixels. If the tabular data does not contain more than one image exceeding the maximum pixel width allowance (step 1203), then the heuristic procedure 1200 terminates. If the tabular data contains more than one image exceeding the maximum pixel width allowance (step 1203), then the heuristic procedure 1200 determines if the images are logically related (step 1205). If the images are not logically related (step 1205), then the heuristic procedure 1200 removes the tabular format for the table (step 1207). In this regard, the heuristic procedure 1200 may resemble the heuristic procedure 500 shown in FIG. 5.

If the images are logically related (step 1205), then the heuristic procedure 1200 sizes the images to fit a maximum display width (step 1209). The heuristic procedure 1200 assumes that the tabular formatting for logically related images should be retained if possible. Of course, a different absolute maximum width allowance may be appropriate for different display devices (e.g., the display device 212 shown in FIG. 2). For example, a preferred absolute maximum width allowance for many models of Handspring Visor computers is 350 pixels. The absolute maximum width allowance may be selected based upon a number of factors, such as minimizing the amount of horizontal scrolling that must be performed by the user in order to review the remote data page (e.g., the remote data page 211) as displayed.

Software implementing the display heuristics may be written for operation with any computer operating system and for operation in any computing environment. In addition, any such software may be designed using CORBA, ACTIVEX® controls, JavaScript, and/or Java applets. According to one embodiment of the invention, Java applets may provide a plug-in display heuristics module for use with another application on both a single computer and in a networked embodiment.

System operators and users may modify variables used by the display heuristics software, according to embodiments of the invention. For example, embodiments of the invention may allow a user to modify or update the maximum pixel width allowance used for images to be displayed on her portable computing device. Likewise, the display heuristics software may be configured to use different variables for different portable computing devices and different models of portable computing devices. The proxy server may include software that determines the display characteristics of portable computing devices requesting remote data pages and tunes the tabular data in the remote data pages to fit the display characteristics of the device.

The display heuristics may be developed using an object-oriented programming methodology or using any other programming methodology that results in a computing system having appropriate functionality. The invention has been discussed in terms of computer programs but is equally applicable for systems utilizing hardware that performs similar functions, such as application specific integrated circuits ("ASICs").

These and other changes can be made to the invention in light of the above detailed description. In general, in the following claims, the terms used should not be construed to limit the invention to the specific embodiments disclosed in the specification and the claims, but should be construed to include all systems and methods that operate under the claims set forth hereinbelow. Accordingly, the invention is not limited by the disclosure.

What is claimed is:

1. A method for translating tabular data prepared for a first display format into a second display format, comprising:
    determining if the tabular data includes nested tables, wherein the nested tables include an inner table and outer tables;
    removing tabular data formatting if the inner table contains less than one column or less than one row;
    removing tabular data formatting if the inner table contains more than one column exceeding a first predetermined width allowance;
    removing tabular data formatting if the inner table has a horizontal display length greater than a second predetermined width allowance; and
    removing tabular data formatting for the outer tables.

2. The method of claim 1, wherein removing tabular data formatting if the inner table contains more than one column exceeding a first predetermined width allowance, comprises:
examining columns in the inner table to determine if more than one column contains a form input field, an image exceeding a maximum pixel width allowance, or text exceeding a maximum text length allowance.

3. The method of claim 2 wherein the maximum pixel width allowance is 120 pixels.

4. The method of claim 2 wherein the maximum text length allowance is 40 characters.

5. A method of translating tabular data prepared for a first display format into a second display format, comprising:
determining if columns in the tabular data contain image data exceeding a maximum pixel width allowance;
determining if columns in the tabular data contains a form input field;
determining if columns in the tabular data contain text data exceeding a maximum text length allowance;
removing tabular formatting if more than one column in the tabular data contains image data exceeding the maximum pixel width allowance, contains a form input field, or contains text data exceeding a maximum text length allowance; and
determining if the tabular data contains nested tables, wherein the nested tables include an inner table and at least one outer table;
removing tabular formatting for the at least one outer table.

6. The method of claim 5, further comprising:
determining if the tabular data exceeds an absolute maximum width allowance; and
removing tabular formatting if the tabular data exceeds the absolute maximum width allowance.

7. The method of claim 6 wherein the absolute maximum width allowance is 350 pixels.

8. The method of claim 6, further comprising:
determining if the tabular data contains related images if the tabular data exceeds the absolute maximum width allowance; and
sizing the related images to fit within the absolute maximum width allowance.

9. The method of claim 5, further comprising:
determining if the tabular data contains more than a single row;
determining if the tabular data contains more than a single column; and
removing the tabular formatting if the tabular data contains only a single row or a single column.

10. The method of claim 5 wherein the maximum pixel width allowance is 120 pixels.

11. The method of claim 5 wherein the maximum text length allowance is 40 characters.

12. A system for translating tabular data from a first display format to a second display format, comprising:
a single row/single column heuristic module configured to examine tabular data and remove tabular formatting from the tabular data if the tabular data contains less than two columns or less than two rows;
a maximum width display heuristic module configured to examine tabular data and remove tabular formatting from the tabular data if the tabular data indicates a horizontal display length exceeding an absolute maximum width allowance;
a wide column display heuristic module configured to examine tabular data and remove tabular formatting if the tabular data contains more than one column exceeding a predetermined maximum column width; and
a nested table display heuristic module configured to examine tabular data, determine if the tabular data indicates nested tables, containing an inner table and at least one outer table, and remove tabular formatting from the at least one outer table if the outer table exists.

13. The system of claim 12 wherein the wide column display heuristic module further comprises:
a first column examiner configured to indicate that a column in the tabular data exceeds the predetermined maximum column width if the column contains image data exceeding a maximum pixel width allowance;
a second column examiner configured to indicate that a column in the tabular data exceeds the predetermined maximum column width if the column contains a form input field; and
a third column examiner configured to indicate that a column in the tabular data exceeds the predetermined maximum column width if the column contains text data exceeding a maximum text length allowance.

14. The system of claim 13 wherein the maximum pixel width allowance is 120 pixels.

15. The system of claim 13 wherein the maximum text length allowance is 40 characters.

16. The system of claim 12 wherein the maximum width display heuristics module further comprises:
a related image module configure to determine if images exceeding the absolute maximum width allowance are related and resize related images to fit within the absolute maximum width allowance.

17. A proxy server, comprising:
a processor configured to process requests for remote data pages received from portable computing devices;
display heuristics software configured to examine tabular data in remote data pages and translate the tabular data from a first display format to a second display format;
a memory configured to retain the display heuristics software and data generated by the display heuristics software during examination of the tabular data; and
a nested table display heuristic module configured to examine the tabular data, determine if the tabular data indicates nested tables, containing an inner table and at least one outer table, and remove tabular formatting from the at least one outer table.

18. The proxy server of claim 17, wherein the display heuristics software further comprises:
a single row/single column heuristic module configured to the examine tabular data and remove tabular formatting from the tabular data if the tabular data contains less than two columns or less than two rows.

19. The proxy server of claim 17, wherein the display heuristics software further comprises:
a maximum width display heuristic module configured to examine the tabular data and remove tabular formatting from the tabular data if the tabular data indicates a horizontal display length exceeding an absolute maximum width allowance.

20. The proxy server of claim 17, wherein the display heuristics software further comprises:
a wide column display heuristic module configured to examine the tabular data and remove tabular formatting if the tabular data contains more than one column exceeding a predetermined maximum column width.

* * * * *